H. H. STEELE.
TYPE WRITING MACHINE.
APPLICATION FILED NOV. 22, 1909.
966,716.
Patented Aug. 9, 1910.
4 SHEETS—SHEET 3.
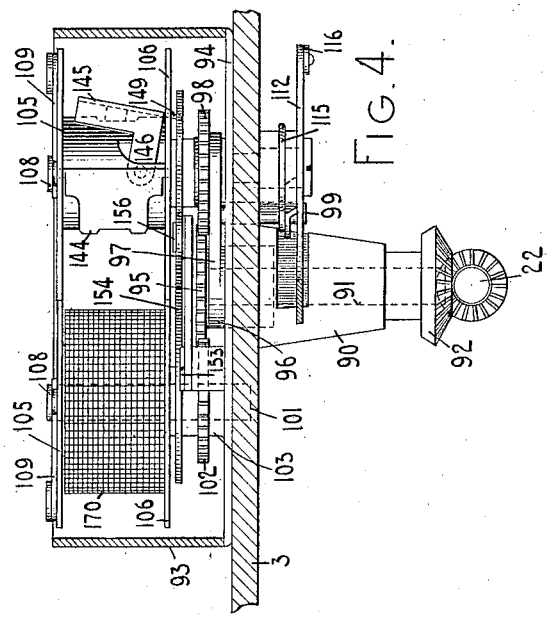
WITNESSES:
INVENTOR:
Herbert H. Steele
By Jacob Felbel
HIS ATTORNEY

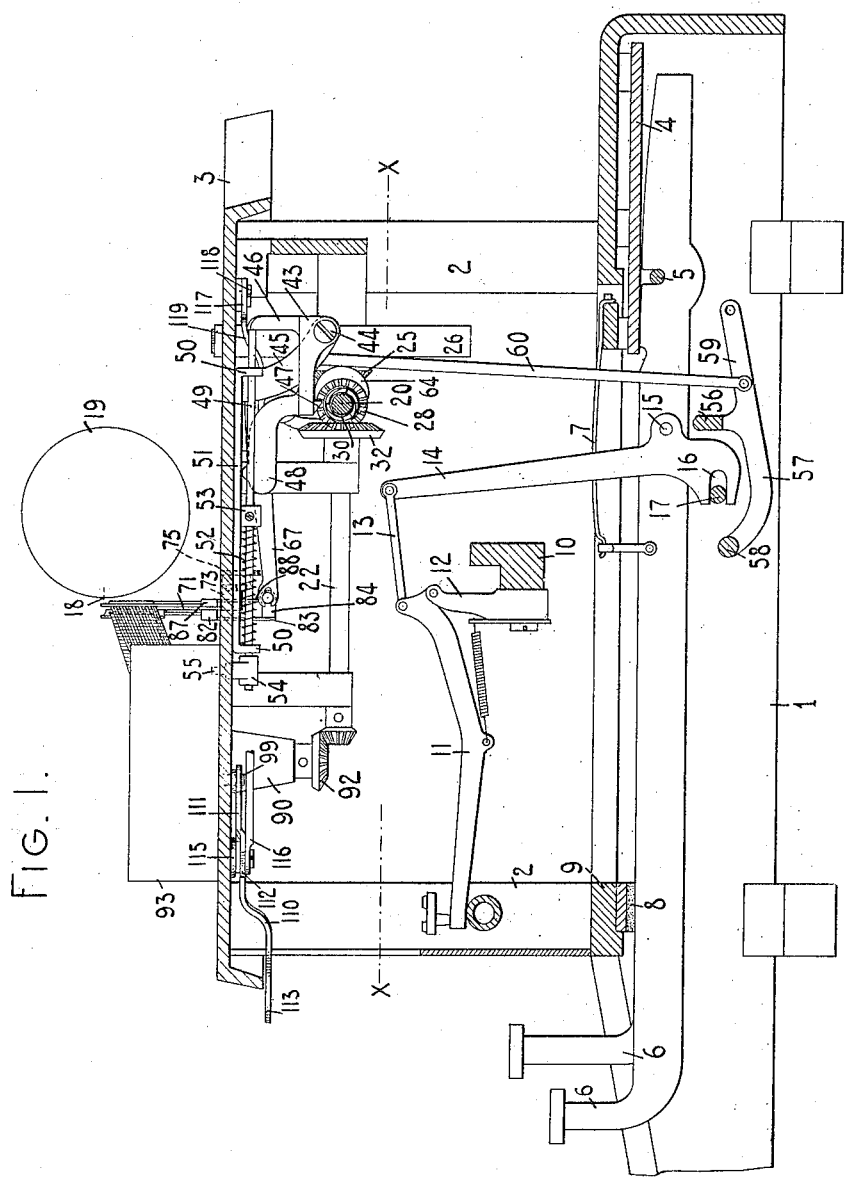

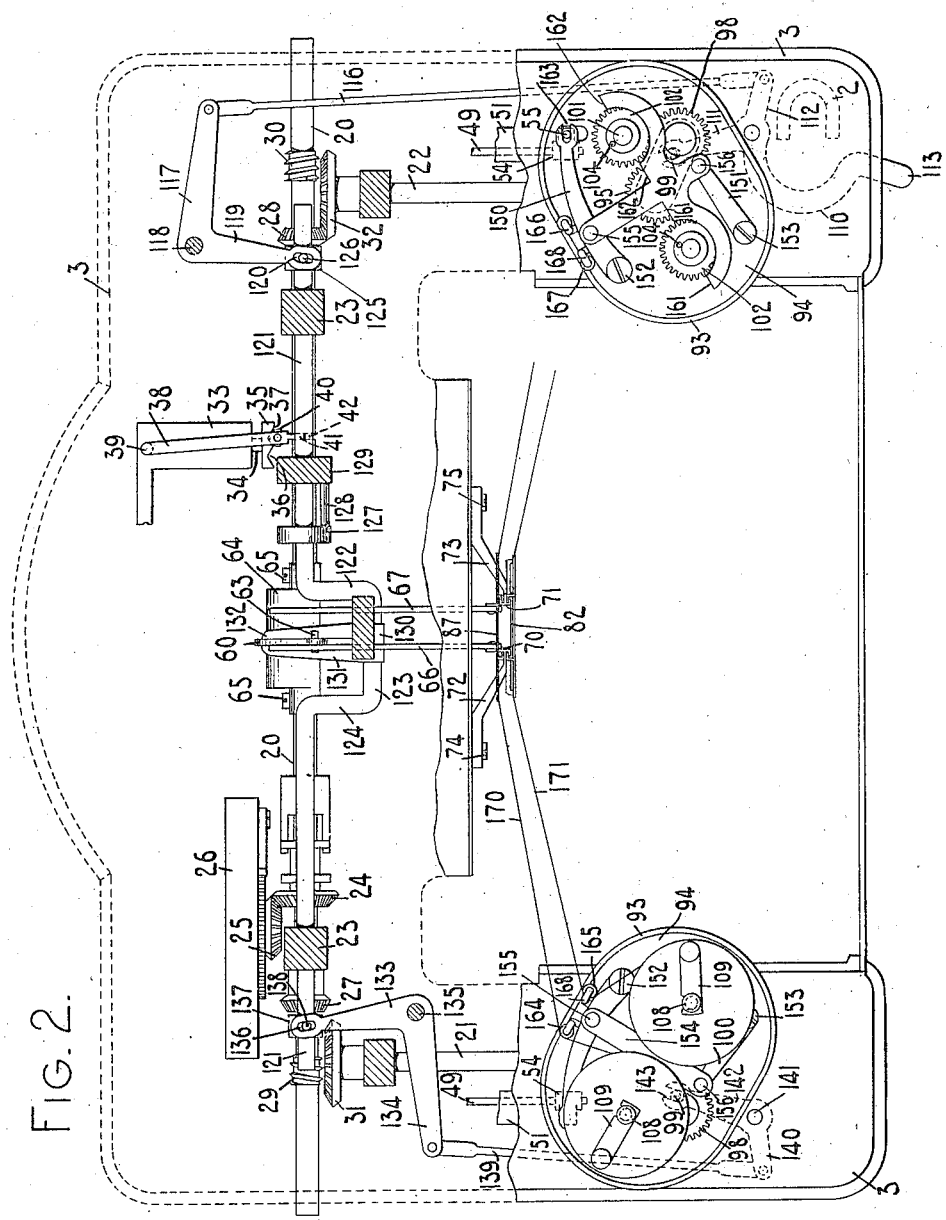

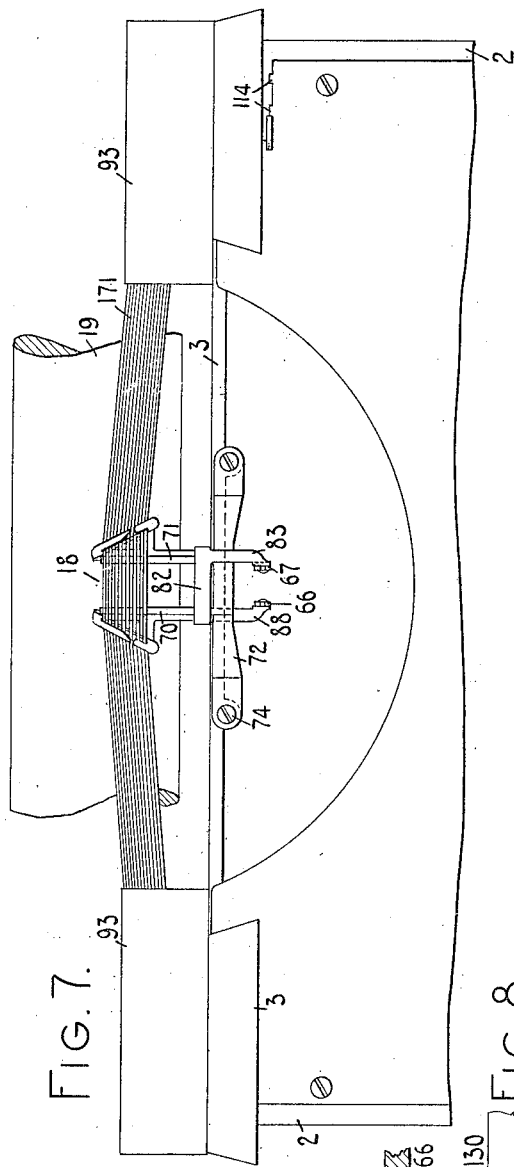

UNITED STATES PATENT OFFICE.

HERBERT H. STEELE, OF MARCELLUS, NEW YORK, ASSIGNOR TO THE MONARCH TYPE-WRITER COMPANY, OF SYRACUSE, NEW YORK, A CORPORATION OF NEW YORK.

TYPE-WRITING MACHINE.

966,716.

Specification of Letters Patent.   Patented Aug. 9, 1910.

Application filed November 22, 1909. Serial No. 529,272.

*To all whom it may concern:*

Be it known that I, HERBERT H. STEELE, citizen of the United States, and resident of Marcellus, in the county of Onondaga and State of New York, have invented certain new and useful Improvements in Type-Writing Machines, of which the following is a specification.

This invention relates especially to improvements in ribbon-mechanism which appertains to visible-writing machines and which comprises two ribbons, one facing the other, two sets of ribbon-spools, and means for vibrating the ribbons alternately.
The invention consists of ribbon-mechanism embodying any or all of the combinations which are hereinafter described and claimed.

On the accompanying sheets of drawings, on which like reference numerals designate like parts in different views, Figure 1 is a side and sectional elevation of portions of a typewriting machine embodying the invention, the part of the section shown above the line *x—x* being on a plane that cuts the frame of the machine close to the right side; Fig. 2, a plan of portions of the ribbon-mechanism of this machine; Fig. 3, an enlarged plan of gearing and other devices which are represented in Fig. 2; Fig. 4, a front elevation of said gearing and other devices and of two ribbon-spools, and a vertical section of a ribbon-cup and a part of the top plate of the machine; Fig. 5, a vertical section of a gear and fragments of the top-plate and bottom of a ribbon-cup, and a side elevation of a ribbon-spool axle; Fig. 6, a cross-section of a ribbon-spool close to its upper head; Fig. 7, a front elevation showing (1) the upper part of the front of the frame, (2) ribbon-cups, (3) ribbon-vibrators, (4) a ribbon, and (5) a fragment of the platen; Fig. 8, a rear elevation on an enlarged scale of devices and parts of devices shown in plan in Fig. 2; Fig. 9, a side elevation of a vibrator-actuating lever, a lever-actuating link, and a device for controlling said link; Fig. 10, a perspective of a ribbon vibrator; Fig. 11, a perspective of a vibrator-guide; and Fig. 12, a perspective of another ribbon vibrator.

The invention is illustrated herein as a part of a Monarch typewriting machine, and since the construction of that machine is well known, it is regarded unnecessary to show or describe more than a few of its parts besides those which are included in the ribbon mechanism.

The frame of the machine is composed of a base 1, posts 2 and a top plate 3, and in the base are the key-levers which bear against a fulcrum-plate 4 and through which extends a retaining rod 5, each key-lever 6 being normally held by a restoring spring 7 in contact with the fulcrum-plate and with a pad 8 attached to a cross-bar 9 forming part of the base 1. The type bars are mounted on a segment 10, each type bar 11 being pivoted in a hanger 12 and connected by a link 13 with a sub-lever 14 which is pivoted at 15 to a key-lever 6, and which contains a slot 16 through which extends a fixed rod 17. When the machine is operated the front ends of the type bars are swung upward and backward and the type travel to the printing point 18 at the front of the platen 19. The spool-driving mechanism of this machine comprises a shaft 20 whose axis is parallel to that of the platen, shafts 21 and 22 whose axes are at right angles to that of the shaft 20, the bevel gears and pinions shown in Fig. 2, and bevel pinions on the front ends of the shafts 21 and 22. The shaft 20 is mounted in hangers 23 which are fast on the top-plate 3, and the other two shafts are mounted in similar hangers. On the shaft 20 is a bevel-gear 24 which engages with a bevel-gear 25 attached to the spring drum 26, which is the carriage-motor. This shaft is movable axially in its hangers and in the gear 24, but the gear and shaft are so connected that they must rotate together. Bevel pinions 27 and 28, and worms 29 and 30 are affixed to this shaft, and on the rear ends of the shafts 21 and 22 are bevel-gears 31 and 32, respectively. The shaft 20 is movable axially from the position in which it is shown in Fig. 2 so that the pinion 27 will engage with the bevel-gear 31 and that the pinion 28 will be disengaged from the gear 32. Behind this shaft is a block 33 which is fast on a bracket that is affixed to the frame of the machine and in this block is a spring-pressed piston 34 having a head 35 in the front of which are notches 36 and 37, the spring tending to force the piston forward. A bar 38 is pivoted at 39 to this block and on this bar near its front end is a roller 40 which normally rests in one of the notches 36 and 37. On this bar 38 next to its front end is a finger 41, and in the shaft 20 is a groove 42 into which the finger 41 extends. When the shaft 20 is moved axially from the position in which it is shown in Fig. 2 to the other position described, the piston 34 is forced inward by the action on it of the roller 40 and after the roller passes the apex of the tooth on the head 35, between the notches 36 and 37, the action of the piston on the roller tends to complete the required movement of the shaft 20, and these devices serve to retain the shaft in either of its shifted positions.

Near each side of the machine is a device 43 (Fig. 1) which is pivoted by a screw 44 to a support 45 attached to the top plate. This device includes an upright arm 46, a part which extends forward over the shaft 20 and has on it a tooth 47, and an upwardly and forwardly extending arm 48. A rod 49, which extends through lugs 50 formed on a bar 51 that is attached to the top plate, bears at its rear end against the front edge of the arm 46, and on this rod is a spring 52 which is confined between the front lug 50 and a collar 53 fast on the rod, and this spring normally holds the rod and device 43 in the positions in which they are shown in Fig. 1. A hub 54, on which is a stud 55 that extends through the top plate and the bottom of the ribbon-cup, is affixed to the rod 49 at its front end. Each of the devices 43 is so held when it is in its normal position that one of the worms on the shaft 20 is movable under the tooth 47 of the device.

Under the key levers is a universal bar 56, which is fast on arms 57 that are attached to a rock-shaft 58, which extends from side to side of the machine and is pivoted at its ends to the frame. One of the arms 57 is midway between the ends of the rock shaft and universal bar and extends behind the universal bar, and to the extension 59 of this arm is pivoted the lower end of a link 60, which, as shown in Fig. 9, passes behind and over the shaft 20 and includes a downwardly extending part 61, whose rear edge is parallel to the front edge of the main part of the link.

The ribbon mechanism commonly embodied in the Monarch machine includes parts which are substantially the same as the above described parts of the ribbon mechanism of this machine.

At the upper end of the link 60 is a projection 62 which is formed on the link and in which is a pin 63 that is fast therein and extends on opposite sides of the projection, forming studs on the link. A cam 64, which is affixed to the shaft 20 by screws 65, extends between the main part of the link 60 and the downwardly extending portion 61 of this link, and when the shaft 20 rotates this cam imparts a forward and backward motion to the upper end of the link 60 and so controls its action. Two levers 66 and 67 are pivoted side by side in a block 68 which is attached to the top plate, each of these levers having a longitudinal slot 69 in its rear arm (Fig. 9). The upper end of the link 60 is movable toward the sides of the machine so that the pin 63 in it can be made to enter the slot 69 in either of these levers, or can occupy an intermediate position in which said pin is not in engagement with either lever. The front ends of these levers 66 and 67 are connected to ribbon vibrators which fit in and are adapted to slide up and down on a vibrator-guide. This guide consists of two uprights 70 and 71 (Fig. 11) and arms 72 and 73 which are fastened to lugs on the top plate by screws 74 and 75 (Fig. 7). The upright 70 contains grooves 76 and 77 and the upright 71 contains similar grooves 78 and 79. The vibrators are shown separately in Figs. 10 and 12. The vibrator shown in Fig. 12 comprises upright parallel parts 80 and 81 which extend into the grooves 76 and 78, a cross bar 82 which passes in front of the guide, and a leg 83 on which is a rearwardly extending lug 84 to which the lever 67 is connected by means of a pin projecting from the lug into a slot in the front end of the lever. The other vibrator comprises upright parallel parts 85 and 86 which fit in the grooves 77 and 79, a cross bar 87 which extends behind the vibrator guide, and a leg 88 having at its lower end a lug 89 to which the lever 66 is connected in the same manner as the lever 67 is connected to the lug 84.

On the under side of the top plate and near the front of the machine are hubs or bosses 90 through which extend upright shafts 91, the axis of one of these shafts being in the vertical plane containing the axis of the shaft 21, and the axis of the other shaft 91 being in the vertical plane containing the axis of the shaft 22. On the lower ends of the shafts 91 are bevel-gears 92 which engage with the bevel pinions at the front ends of the shafts 21 and 22. On the top plate above the gears 92 are ribbon-cups each comprising an oblong body 93, and a base 94 which is made fast to the top plate. The shafts 91 extend through and above the top plate 3 and the bases 94 of the ribbon-cups. Fixed on each of these shafts at its upper end is a primary driving gear 95, and loose on the shaft below this gear is a hub 96 carrying an arm 97 on which a secondary driving gear 98 is mounted, this gear being in engagement with the primary driving gear 95. A pin 99 which is fast in the arm 97 extends downward therefrom through a slot 100 cut in the top plate and in the base of the ribbon-cup. On opposite sides of the produced axis of the shaft 91 are ribbon spool axles 101 which are fast at their lower ends in the top plate, and loose on each of these axles is a gear 102 (Fig. 5) which rests on a hub 103 formed on the base 94 of the ribbon-cup, and in the hub of each of these gears is a pin 104 which extends above the upper face of the hub. Ribbon spools 105 are mounted on the axles 101, and in the lower head 106 of each spool are holes 107 (Fig. 6) in which the pin 104 of the ribbon spool gear 102 fits so that the gear and spool must rotate together. To the upper end of each axle 101 is affixed a headed stud 108 and on the upper heads of the ribbon spools are pivoted latches 109 which fit under the heads of the studs 108 and prevent the spools from working up on the axles. When the pin 99 is at either end of the slot 100, then the secondary driving gear 98 engages with one of the spool-gears 102; and when the pin 99 is midway between the ends of the slot 100 the gear 98 is disengaged from both of the spool-gears.

To a hub on the lower side of the top plate near the front right post 2 of the frame is pivoted an angular lever 110, which comprises arms 111 and 112, and a finger piece 113 that projects in front of the frame of the machine and fits in notches 114 (Fig. 7). The arm 111 of this lever is slotted at its rear end and there connected to the pin 99 which extends downward from the arm 97 in the right spool-cup, the pin extending through the slot in the arm. A bow-spring 115 which at one end surrounds the hub of this angular lever and at the other end surrounds the pin 99 tends, by its expansion, to hold the pin at either end of the slot 100. This spring is free to turn both on said hub and on said pin. To the arm 112 of this angular lever is pivoted a link 116 which extends backward behind the shaft 20 and is connected at its rear end to an angular lever 117, which is pivoted by a pin 118 to the under side of the top plate and has a forwardly extending arm 119 containing a slot 120. A rod 121, which is bent near the middle to form parts 122, 123 and 124, extends through and is supported by the hangers 23 and is movable endwise therein. A collar 125 is adjustably fixed on this rod by means of a set screw, and on said collar is a stud 126 which extends through the slot 120 in the angular lever 117. Another collar 127 is fast on the rod 121 and a pin 128, which is fast in this collar, extends into a hole in a block 129 which is fast on the top plate, the pin 128 being movable endwise in the block 129. By this means the rod 121 is prevented from turning. A shifting device 130 comprising fingers 131 and 132 is affixed to the part 123 of the rod 121, these fingers extending backward on opposite sides of the link 60. Another angular lever having arms 133 and 134 is pivoted to the top plate by a pin 135, the arm 133 of this lever containing a slot 136, and on the rod 121 is a collar 137 having on it a pin 138 that extends through the slot 136 of this lever. The arm 134 of this lever is connected by a link 139 with an arm 140 of an angular lever which is pivoted by a pin 141 to the top plate and which has a rearwardly extending arm 142 in the rear end of which is a slot 143, which slot is engaged with the pin 99 which extends downward from the interior of the left ribbon-cup.

Each ribbon-spool carries a fastening device 144 (Figs. 4 and 6) by means of which the end of the ribbon may be secured to the spool, and a device 145 having arms 146 which extend into the hub of the spool and are secured thereto by pivots 147, this device having affixed to it a weight 148 and comprising an extension 149, under which there is a hole in the head of the ribbon-spool. This device is normally held by the ribbon so that its upper end is close to the hub of the spool and the lower end of the extension 149 is about even with the under face of the lower head of the spool. On hubs formed on the base of each ribbon-cup a lever 150 and an arm 151 are pivoted by screws 152 and 153 respectively (Fig. 3) and to this lever and arm a bar 154 is pivoted by pins 155 and 156, this bar having branches 157 and 158 which extend in front of the axles of the ribbon-spools and which have curved inner edges 159 and 160 and straight edges 161 and 162. The levers 150 are connected with the studs 55 on the rods 49, these levers having in them slots 163 which receive the studs 55. Rollers 164 and 165 are attached to the left ribbon-cup and similar rollers 166 and 167 are attached to the right ribbon-cup. These rollers are mounted on wires 168 which are bent as indicated in Fig. 3, each of these wires being secured to the base of a ribbon-cup by a screw 169. Two ribbons 170 and 171 are connected to the ribbon-spools and extend through the ribbon-vibrators, the ribbon 170 being wound on the outer ribbon-spools and threaded through the rear vibrator shown in Fig. 10; and the ribbon 171 being on the inner ribbon-spools and threaded through the front vibrator, all as indicated in Fig. 2.

When the parts of the ribbon-mechanism are in the positions in which they are shown in Fig. 2 and the machine is operated, the ribbon 170 will be fed from left to right and will be vibrated in front of the printing point at each operation of the machine, and the ribbon 171 will not be either vibrated or fed longitudinally. The key levers acting on the universal bar 56 force downward the link 60 and this link, acting on the lever 66, elevates the ribbon vibrator of the ribbon 170. Each time the carriage letter spaces the cam or controller 64 is turned slightly so that the upper end of the link 60 is moved either forward or backward and the successive vibrating movements of the ribbon are consequently varied in extent, so that the type act on all parts of the ribbon between its edges. Whenever it is desirable to use the other ribbon the lever 110 is moved by hand to the right until it engages the notch 114 which is nearest to the right side of the machine and by this movement of the lever 110 the secondary driving gears 98 are disengaged from the spool gears which actuate the ribbon 170 and moved into engagement with the spool gears which actuate the ribbon 171, motion being transmitted from the lever 110 to the angular lever pivoted on the pin 141 at the left of the machine through the connecting mechanism which has been described. This operation of the lever 110 forces the angular lever 117 to draw the rod 121 toward the right so that the shifting device 130 affixed to the part 123 of this rod carries the upper end of the link 60 toward the right, disengaging the pin 63 from the lever 66 and engaging this pin with the lever 67. Then at each operation of the machine the ribbon 171 will be fed from left to right and this ribbon will be vibrated, and its successive vibrating movements will vary in extent in consequence of the action of the cam or controller 64 on the link 60. It will be apparent that by moving the lever 110 back to the position in which it is shown in Fig. 2 the ribbon driving mechanism can be rendered operative again on the spools of the ribbon 170, and the vibrator of this ribbon will be again connected with the link 60; and that the feed of the ribbon will be taken up where it was left off the last time said ribbon was used. Whenever a ribbon is drawn from a spool so that the device 145 carried by that spool is uncovered, this device drops to the position in which it is represented in Fig. 4 and the extension 149 thereupon engages either the branch 157 or the branch 158 of the bar 154 and forces the bar and branches forward until said extension passes between the branch on which it acts and the axle of the ribbon spool, the extension bearing against the inner curved edge of the branch. When the bar 154 has been operated as described the curved inner edges 159 and 160 of the branches 157 and 158 coincide with arcs of circles whose centers are on the axes of the ribbon-spool axles so that the extension 149 travels along the inner edge of the branch and prevents the bar from returning to its normal position. The movement of the bar by the device 145 in the manner described draws the slotted end of the lever 150 forward and releases the device 43, whereupon the tooth 47 of that device engages with the adjacent worm on the shaft 20 and causes that shaft to be moved axially to reverse the gearing in a well-known manner.

It is to be understood that the invention may be embodied in mechanism differing more or less in details of construction from that which has been described above.

What I claim as new and desire to secure by Letters Patent, is:—

1. In a typewriting machine, the combination of two ribbons, ribbon spools, spool-driving mechanism, and ribbon vibrating mechanism including a controller having regular movements that change its action, the ribbon vibrating mechanism also including two ribbon vibrators and means coöperative with the controller to vary the movements of each vibrator.

2. In a typewriting machine, the combination of two ribbons, ribbon spools, spool driving mechanism, and ribbon vibrating mechanism including a controller having different positions at the beginning and end of each of two or more successive operations of the machine, the ribbon vibrating mechanism also including two ribbon vibrators and means coöperative with the controller to vary regularly the movements of each vibrator.

3. In a typewriting machine, the combination of two ribbons, ribbon spools, spool driving mechanism, and ribbon vibrating mechanism including a controller having different positions at the beginning and end of each operation of the machine, the ribbon vibrating mechanism also including two ribbon vibrators and means coöperative with the controller to vary in succession the movements of each vibrator.

4. In a typewriting machine, the combination of two ribbons, ribbon spools, spool driving mechanism, and ribbon vibrating mechanism including a controller having successive progressive movements, the ribbon vibrating mechanism also including two ribbon vibrators and means coöperative with the controller to vary the movements of each vibrator.

5. In a typewriting machine, the combination of two ribbons, ribbon spools, spool driving mechanism, and ribbon vibrating mechanism including a rotary controller, two ribbon vibrators, and means coöperative with the controller to vary the movements of each vibrator.

6. In a typewriting machine, the combination of two ribbons, ribbon spools, spool driving mechanism actuated by the carriage motor, and ribbon vibrating mechanism including a controller actuated by a part of the spool driving mechanism, the ribbon vibrating mechanism also including two ribbon vibrators and means coöperative with the controller to vary the movements of each vibrator.

7. In a typewriting machine, the combination of two ribbons, ribbon spools, spool driving mechanism including a shaft, and ribbon vibrating mechanism including a controller attached to said shaft, two ribbon vibrators, and means coöperative with the controller to vary the movements of each vibrator.

8. In a typewriting machine, the combination of two ribbons, ribbon-spools, spool-driving mechanism, and ribbon-vibrating mechanism including two vibrators, two vibrator actuating levers, an actuating device operative on said levers alternately, and a controller operative on said actuating device and having a regularly varying action.

9. In a typewriting machine, the combination of two ribbons, ribbon-spools, spool-driving mechanism, and ribbon-vibrating mechanism including two vibrators, two vibrator-actuating levers, a link operative on said levers alternately, and a controller operative on the link and having a regularly varying action.

10. In a typewriting machine, the combination of two ribbons, ribbon-spools, spool-driving mechanism, and ribbon-vibrating mechanism including two vibrators, two vibrator-actuating levers, an actuating device operative on said levers alternately, and a controller connected with the spool-driving mechanism and operative on said actuating device.

11. In a typewriting machine, the combination of two ribbons, ribbon-spools, spool-driving mechanism, and ribbon-vibrating mechanism including two vibrators, two vibrator-actuating levers, a link operative on said levers alternately, and a controller connected with the spool-driving mechanism and operative on the link.

12. In a typewriting machine, the combination of two ribbons, two pairs of ribbon-spools, spool-driving mechanism operative on said pairs of spools alternately, and ribbon-vibrating mechanism including a controller having regular movements that change its action, the ribbon vibrating mechanism also including two ribbon vibrators and means coöperative with the controller to vary the movements of each vibrator.

13. In a typewriting machine, the combination of two ribbons, two pairs of ribbon-spools, self-reversing spool-driving mechanism operative on said pairs of spools alternately, and ribbon-vibrating mechanism including a controller having regular movements that change its action and thus render it coöperative with other parts of the ribbon-vibrating mechanism to vary the vibrating movements of each ribbon.

14. In a typewriting machine, the combination of two ribbons, two pairs of ribbon-spools, spool-driving mechanism operative on said pairs of spools alternately, hand-operated mechanism adapted to connect the spool-driving mechanism with and disconnect it from each pair of spools, and ribbon-vibrating mechanism including a controller and an actuating device movable by said hand operated mechanism, the controller having regular movements, and the ribbon vibrating mechanism also including two ribbon vibrators and means coöperative with the controller and said actuating device to vary the movements of each vibrator.

15. In a typewriting machine, the combination of two ribbons, two pairs of ribbon-spools, self-reversing spool-driving mechanism operative on said pairs of spools alternately, hand-operated mechanism adapted to connect the spool-driving mechanism with and disconnect it from each pair of spools, and ribbon-vibrating mechanism including a controller, and an actuating device movable by said hand operated mechanism, the controller having regular movements that make it coöperative with said actuating device and other parts of the ribbon-vibrating mechanism to vary the vibrating movements of each ribbon.

16. In a typewriting machine, the combination of two ribbons, two pairs of ribbon-spools, spool-driving mechanism operative on said pairs of spools alternately, hand operated mechanism adapted to connect the spool-driving mechanism with and disconnect it from each pair of spools, and ribbon-vibrating mechanism including two vibrators, two vibrator-actuating levers, an actuating device operative on said levers alternately and connected to said hand-operated mechanism, and a controller operative on said actuating device and having a regularly varying action.

17. In a typewriting machine, the combination of two ribbons, two pairs of ribbon-spools, spool-driving mechanism operative on said pairs of spools alternately, hand-operated mechanism adapted to connect the spool-driving mechanism with and disconnect it from each pair of spools, and ribbon-vibrating mechanism including two vibrators, two vibrator-actuating levers, an actuating device operative on said levers alternately and connected to said hand-operated mechanism, and a controller connected with the spool-driving mechanism and operative on said actuating device.

18. In a typewriting machine, the combination of two ribbons, two pairs of ribbon-spools, self-reversing spool driving mechanism operative on said pairs of spools alternately, hand-operated mechanism adapted to connect the spool-driving mechanism with and disconnect it from each pair of spools, and ribbon-vibrating mechanism including two vibrators, two vibrator-actuating levers, an actuating device operative on said levers alternately and connected with said hand-operated mechanism, and a controller operative on said actuating device and having a regularly varying action.

19. In a typewriting machine, the combination of two ribbons, two pairs of ribbon-spools, self-reversing spool driving mechanism operative on said pairs of spools alternately, hand-operated mechanism adapted to connect the spool-driving mechanism with and disconnect it from each pair of spools, and ribbon-vibrating mechanism including two vibrators, two vibrator-actuating levers, an actuating device operative on said levers alternately and connected with said hand-operated mechanism, and a controller connected with the spool driving mechanism and operative on said actuating device.

20. In a typewriting machine, the combination of two ribbon-spools arranged edge to edge and near together, two spool-gears whose axes coincide with the prolonged axes of said spools, each spool-gear being connected to one of the spools, a primary driving gear, mechanism operative to rotate said primary driving gear, a secondary driving gear whose axis is parallel to that of the primary driving gear, the secondary driving gear being engaged with the primary driving gear and being movable into and out of engagement with each of said spool-gears, two other similar ribbon-spools and other similar spool-driving mechanism, and two ribbons operative by said four ribbon-spools.

21. In a typewriting machine, the combination of two ribbon-spools arranged edge to edge and near together, two spool-gears whose axes coincide with the prolonged axes of said spools, each spool-gear being connected to one of the spools, a primary driving gear, mechanism operative to rotate said primary driving gear, gearing including a gear whose axis is parallel to that of the primary driving gear and which is engaged with the primary driving gear, said gear being operative on said spool-gears alternately, two other similar ribbon spools and other similar spool-driving mechanism, and two ribbons operative by said four ribbon spools.

22. In a typewriting machine, the combination of two ribbon-spools arranged edge to edge and near together, two spool-gears whose axes coincide with the prolonged axes of said spools, each spool-gear being connected to one of the spools, a shaft, a primary driving gear fast on said shaft, mechanism operative to rotate said shaft, an angularly movable arm on said shaft, a secondary driving gear mounted on said arm and engaged with the primary driving gear and movable by said arm into and out of engagement with each of said spool-gears, two other similar ribbon-spools and other similar spool-driving mechanism, and two ribbons operative by said four ribbon-spools.

23. In a typewriting machine, the combination of two ribbon-spools arranged edge to edge and near together, two spool-gears whose axes coincide with the prolonged axes of said spools, each spool-gear being connected to one of the spools, a shaft, a primary driving gear fast on said shaft, mechanism operative to rotate said shaft, an angularly movable arm on said shaft, gearing mounted on said arm and engaged with the primary driving gear and operative on said spool-gears alternately, two other similar ribbon-spools and other similar spool-driving mechanism, and two ribbons operative by said four ribbon-spools.

24. In a typewriting machine, the combination of two ribbon-spools arranged edge to edge and near together, two spool-gears whose axes coincide with the prolonged axes of said spools, each spool-gear being connected to one of the spools, a shaft, a primary driving gear fast on said shaft, mechanism operative to rotate said shaft, an angularly movable arm on said shaft, a spring arranged to hold said arm in different positions, a secondary driving gear mounted on said arm and engaged with the primary driving gear and movable by said arm into and out of engagement with each of said spool-gears, two other similar ribbon-spools and other similar spool-driving mechanism, and two ribbons operative by said four ribbon-spools.

25. In a typewriting machine, the combination of two ribbon-spools arranged edge to edge and near together, two spool gears whose axes coincide with the prolonged axes of said spools, each spool gear being connected to one of the spools, a shaft, a primary driving gear fast on said shaft, a secondary driving gear engaged with said primary driving gear and movable into and out of engagement with each of said spool gears, two other similar ribbon-spools, mechanism operative on these spools and including a shaft and a primary driving gear and a secondary driving gear similar to the shaft and driving gears above specified, two ribbons operative by said four ribbon-spools, shaft-driving mechanism operative on said shafts, and means, including devices carried by said spools, for reversing the action of the spool-driving mechanism.

26. In a typewriting machine, the combination of two ribbon-spools arranged edge to edge and near together, two spool-gears whose axes coincide with the prolonged axes of said spools, each spool-gear being connected to one of the spools, a shaft, a primary driving gear fast on said shaft, an angularly movable arm on said shaft, a secondary driving gear mounted on said arm and engaged with the primary driving gear and movable by said arm into and out of engagement with each of said spool gears, two other similar ribbon-spools, mechanism operative on these spools and including a shaft and a primary driving gear and a secondary driving gear similar to the shaft and driving gears above specified, two ribbons operative by said four ribbon-spools, shaft-driving mechanism operative on said shafts, and means, including devices carried by said spools, for reversing the action of the spool-driving mechanism.

27. In a typewriting machine, the combination of two ribbon-spools arranged edge to edge and near together, two spool-gears whose axes coincide with the prolonged axes of said spools, each spool-gear being connected to one of the spools, a shaft, a primary driving gear fast on said shaft, an angularly movable arm on said shaft, a spring arranged to hold said arm in different positions, a secondary driving gear mounted on said arm and engaged with the primary driving gear and movable by said arm into and out of engagement with each of said spool gears, two other similar ribbon-spools, mechanism operative on these spools and including a shaft and a primary driving gear and a secondary driving gear similar to the shaft and driving gears above specified, two ribbons operative by said four ribbon-spools, shaft-driving mechanism operative on said shafts, and means, including devices carried by said spools, for reversing the action of the spool-driving mechanism.

28. In a typewriting machine, the combination of two ribbon-spools arranged edge to edge and near together, two spool-gears whose axes coincide with the prolonged axes of said spools, each spool-gear being connected to one of the spools, a primary driving gear, mechanism operative to rotate said primary driving gear, secondary gearing including a gear whose axis is parallel to that of the primary driving gear and which is engaged with the primary driving gear, said gear being operative on said spool-gears alternately, two other similar ribbon-spools and other similar spool-driving mechanism, two ribbons operative by said four ribbon-spools, and hand-actuated gear shifting mechanism operative on the secondary driving gears.

29. In a typewriting machine, the combination of two ribbon-spools arranged edge to edge and near together, two spool-gears whose axes coincide with the prolonged axes of said spools, each spool-gear being connected to one of the spools, a shaft, a primary driving gear fast on said shaft, mechanism operative to rotate said shaft, an angularly movable arm on said shaft, secondary gearing mounted on said arm and engaged with the primary driving gear and movable by said arm into and out of engagement with said spool-gears, two other similar ribbon-spools and other similar spool-driving mechanism, two ribbons operative by said four ribbon-spools, and hand-actuated gear shifting mechanism operative on the arms which carry the secondary driving gears.

30. In a typewriting machine, the combination of two ribbon-spools arranged edge to edge and near together, two spool-gears whose axes coincide with the prolonged axes of said spools, each spool-gear being connected to one of the spools, a primary driving gear, mechanism operative to rotate the primary driving gear, secondary gearing including a gear whose axis is parallel to that of the primary driving gear and which is engaged with the primary driving gear, said gear being operative on said spool-gears, two other similar ribbon-spools and other similar spool-driving mechanism, two ribbons operative by said four ribbon-spools, ribbon-vibrating mechanism including an actuating device which is movable to render it operative on either ribbon, and hand-actuated mechanism operative to shift the secondary driving gears and said actuating device.

31. In a typewriting machine, the combination of two ribbon-spools arranged edge to edge and near together, two spool-gears whose axes coincide with the prolonged axes of said spools, each spool-gear being attached to one of the spools, a shaft, a primary driving gear fast on said shaft, mechanism operative to rotate said shaft, an angularly movable arm on said shaft, secondary gearing mounted on said arm and engaged with the primary driving gear and movable by said arm into and out of engagement with said spool-gears, two other similar ribbon-spools and other similar spool-driving mechanism, two ribbons operative by said four ribbon-spools, ribbon vibrating mechanism including an actuating device which is movable to render it operative on either ribbon, and hand actuated mechanism operative to move said actuating device and the arms which carry the secondary driving gears.

32. In a typewriting machine, the combination of two alternately operating ribbon-spools arranged edge to edge and near together, devices carried by these ribbon-spools and normally held in inoperative positions, and ribbon reversing mechanism including a part which is movable by each of the aforesaid devices.

33. In a typewriting machine, the combination of two alternately operating ribbon-spools arranged edge to edge and near together, devices carried by these ribbon-spools and normally held in inoperative positions, a lever and a pivoted arm whose pivotal axes are parallel to the axes of the spools and on opposite sides of a plane containing the axes of the spools, a bar pivoted to said lever and arm and having branches on which the aforesaid devices are operative to move said lever, and ribbon-reversing mechanism including a part connected to said lever.

34. In a typewriting machine, the combination of two ribbons, ribbon spools, spool driving mechanism, ribbon vibrating mechanism, and a shifting device, the ribbon vibrating mechanism including two vibrators, two vibrator actuating levers, and a link attached at one end to a part of the machine and adapted to engage said levers alternately at its other end, each of said levers being attached at one end to one of the vibrators, and said link being engaged by said shifting device and movable thereby into engagement with each of said levers and into an inoperative position.

35. In a typewriting machine, the combination of two ribbons, ribbon-spools, spool-driving mechanism, ribbon vibrating mechanism, and a shifting device, the ribbon vibrating mechanism including two vibrators, two vibrator actuating levers, and a link extending between and operative on said levers, each of said levers being connected to one of the vibrators and containing an oblong slot, and said link having studs thereon that fit in the slots of the levers and being engaged by said shifting device and movable thereby into connection with each of said levers and into an inoperative position.

36. In a typewriting machine, the combination of two ribbons, ribbon-spools, spool-driving mechanism, ribbon-vibrating mechanism, and a shifting-device, the ribbon-vibrating mechanism including two vibrators, two vibrator-actuating levers, a link operative on said levers, and a controller, each of said levers being connected to one of the vibrators, and the controller being operative on said link to vary its action on the levers, and said link being engaged by said shifting-device and movable thereby into connection with each of said levers and into an inoperative position.

37. In a typewriting machine, the combination of two ribbons, ribbon-spools, spool-driving mechanism, ribbon-vibrating mechanism, and a shifting-device, the ribbon-vibrating mechanism including two ribbons, two vibrator-actuating levers, a link extending between and operative on said levers, and a controller, each of said levers being connected to one of the vibrators and containing an oblong slot, and said link having studs thereon that fit in the slots of said levers and being engaged by said shifting-device and movable thereby into connection with each of said levers and into an inoperative position, and the controller being operative on said link to vary its action on the levers.

38. In a typewriting machine, the combination of two ribbons, ribbon-spools, spool-driving mechanism, ribbon-vibrating mechanism, and a shifting-device, the ribbon-vibrating mechanism including two vibrators, two vibrator-actuating levers, a link operative on said levers, and a cam, each of said levers being connected to one of the vibrators, and the cam being attached to a part of the spool-driving mechanism and operative on said link to vary its action on the levers, and said link being engaged by said shifting-device and movable thereby into connection with each of said levers and into an inoperative position.

39. In a typewriting machine, the combination of two ribbons, ribbon-spools, spool-driving mechanism including a shaft, ribbon-vibrating mechanism, and a shifting-device, the ribbon-vibrating mechanism including two vibrators, two vibrator-actuating levers, a link operative on said levers, and a cam, each of said levers being connected to one of the vibrators, and the cam being attached to said shaft and fitting between parts of said link and being operative on the link to vary its action on the levers, and said link being engaged by said shifting device and movable thereby into connection with each of said levers and into an inoperative position.

40. In a typewriting machine, the combination of a ribbon-spool, a device carried by the ribbon-spool and normally held in an inoperative position, and ribbon-reversing mechanism including a part which is mounted on the frame and which has an arc-shaped edge on which said device acts during the reversing operation.

41. In a typewriting machine, the combination of a ribbon-spool, a device carried by the ribbon-spool and normally held in an inoperative position, and ribbon-reversing mechanism including a spring, and connected parts which are mounted on the frame and normally held by said spring in inoperative positions, said parts being movable by said device against the action of the spring, and one of said parts having an arc-shaped edge on which said device acts to keep said parts in their operative positions during the reversing operation.

Signed at Marcellus, in the county of Onondaga, and State of New York, this 18th day of November A. D. 1909.

HERBERT H. STEELE.

Witnesses:
BESSIE G. KETTELL,
ALICE GREENE.